(12) United States Patent
Kalinoski

(10) Patent No.: US 6,752,027 B1
(45) Date of Patent: Jun. 22, 2004

(54) VORTEX FLOWMETER INCLUDING REMOVEABLE AND REPLACEABLE FLOW-OBSTRUCTION ELEMENT

(75) Inventor: Richard W. Kalinoski, Little Compton, RI (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/543,153

(22) Filed: Apr. 5, 2000

Related U.S. Application Data

(60) Provisional application No. 60/127,925, filed on Apr. 6, 1999.

(51) Int. Cl.[7] .............................................. G01F 1/32
(52) U.S. Cl. .................................................... 73/861.22
(58) Field of Search ...................................... 73/861.22

(56) References Cited

U.S. PATENT DOCUMENTS 3,972,232 A * 8/1976 Miller et al. ............. 73/861.22
5,869,772 A    2/1999 Storer ...................... 73/861.24
6,220,103 B1 * 4/2001 Miller et al. ............. 73/861.22

FOREIGN PATENT DOCUMENTS

EP   0 666 468      8/1995
GB   2 101 316 A    1/1983

OTHER PUBLICATIONS

International Search Report.

* cited by examiner

*Primary Examiner*—Harshad Patel
(74) *Attorney, Agent, or Firm*—Kevin A. Oliver; Foley Hoag LLP

(57) ABSTRACT

An insertion-type vortex flowmeter that includes an obstruction element removably and replaceably disposed within a pipe. The obstruction element is configured to only partially span the inner diameter of the pipe, and employs multiple flange sub-assemblies to mount the obstruction element to the pipe. The flowmeter also employs a fluid conditioning element that has a major axis that extends axially within the pipe and transverse to the obstruction element.

42 Claims, 7 Drawing Sheets

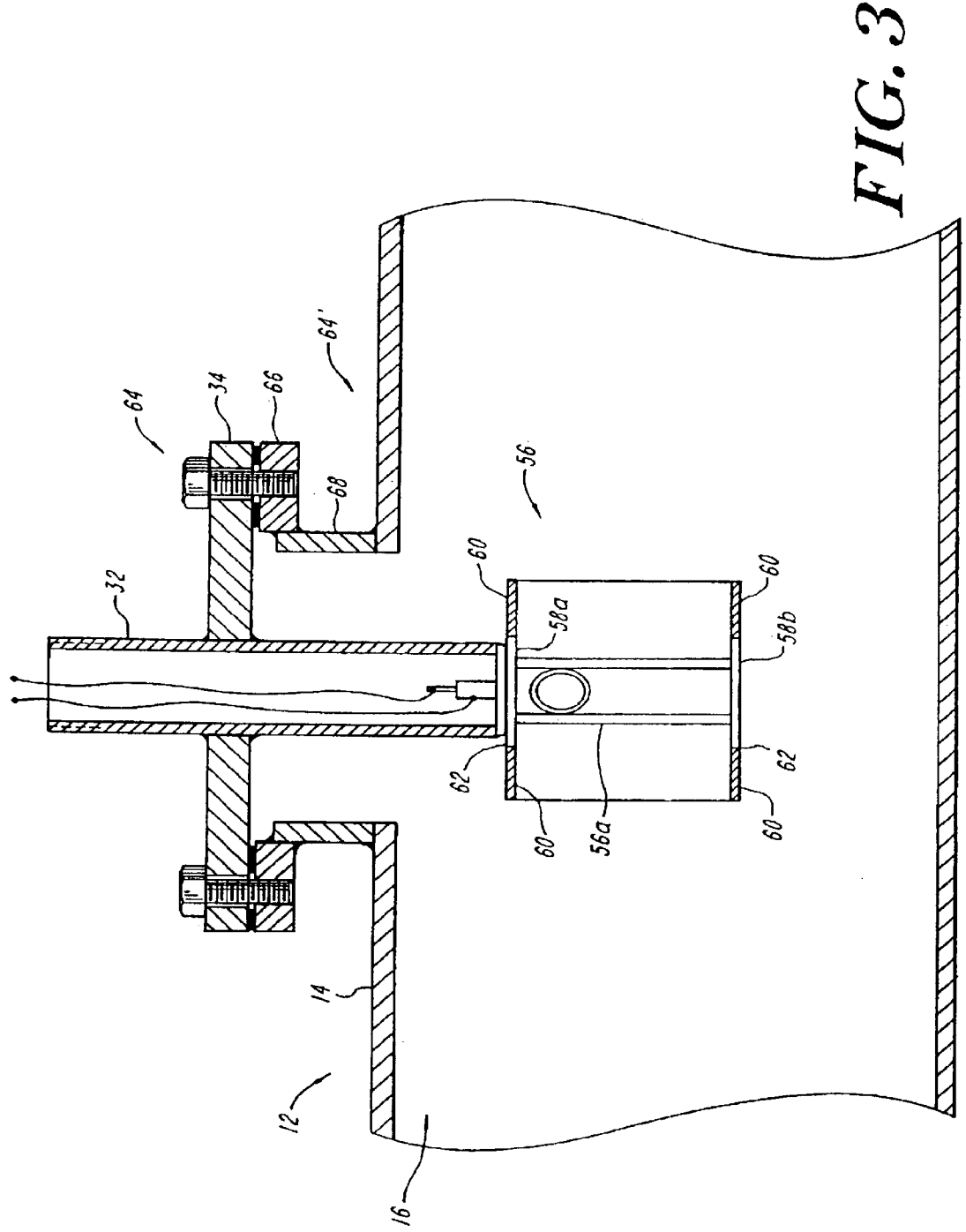

VORTEX FLOWMETER INCLUDING REMOVEABLE AND REPLACEABLE FLOW-OBSTRUCTION ELEMENT

This application claims benefit of 60/127,925, filed Apr. 6, 1999.

BACKGROUND OF THE INVENTION

This invention relates generally to apparatus and methods for measuring flow rates of fluids. In particular, the invention relates to an improved vortex flowmeter. Vortex flowmeters measure the rate of flow of a fluid, termed a process fluid, by measuring the frequency of artificially induced vortices in the fluid. Such flowmeters are known in the art, and include those marketed by The Foxboro Company, Foxboro, Mass., U.S.A. ("Foxboro") under the trade designation E83. Vortex flowmeters are popular because of their relatively high accuracy and wide dynamic range. In addition many vortex flow meters can operate in extreme temperatures, for example, up to 800° F.

Vortex flowmeters typically have a tubular passage, such as a pipe, for guiding the process fluid therethrough and have an obstruction element, also termed a vortex shedder, interposed in the path of fluid flow. The obstruction element includes a bluff surface facing the fluid flow for creating a series of spaced vortices downstream in the flowing fluid. Under certain conditions, the vortex shedder creates two nearly-parallel rows of vortices on opposite sides of the shedder. These vortices are known in the art as a Von Kalman vortex street. The vortices in one row are staggered with respect to the vortices in the other row. It is understood that the frequency of these generated vortices is typically linearly proportional to the average flow velocity of the fluid. Thus, a measurement of the frequency of the vortices provides a measure of the average flow velocity. A vortex-responsive sensor detects the pressure fluctuations associated with the passage of the vortices and drives an electronic unit that determines the frequency of the vortices, to determine the flow velocity of the fluid.

In many conventional vortex flowmeters, the obstruction element spans the entire diameter of the pipe that guides the flowing fluid, and it typically forms an integral structure with the pipe. Such an integral structure does not allow easy access to the obstruction element, thereby rendering inspection of the obstruction element difficult. In addition, such a structure does not allow easy replacement of the obstruction element when such a replacement becomes desirable.

Another disadvantage of conventional vortex flowmeters having obstruction elements that span the entire diameter of the fluid-guiding pipe is that the vortex-shedding frequency for pipes having large diameters is low. For example, the vortex-shedding frequency in a vortex-flowmeter having a pipe with a diameter of approximately 12 inches (30 cm), is typically as low as 1 Hz for a flow rate of approximately 1 ft/sec, and is less than 1 Hz for larger pipes. Various sources of noise in a vortex flowmeter contribute to the noise level of a vortex-induced signal. To reduce the noise level of the signal, a vortex flowmeter typically obtains an average signal by integrating the vortex-induced signals over a number of vortices. A vortex flow meter having a low vortex frequency, however, would require a long averaging time for an effective reduction in the noise. Thus, the response time of such a flowmeter is typically slow.

Flowmeters that have flow measuring elements that are inserted into the path of a flowing fluid without spanning the entire diameter of the pipe are also known in the art. Many of such flowmeters do not rely on generating vortices for measuring the flow velocity of the fluid. For example, paddle wheel and annubar meters, and pitot tubes are known in the art. Such flowmeters have either small pressure ports that are susceptible to clogging or moving parts that tend to wear out, and thus require periodic inspection and replacement.

U.S. Pat. No. 4,562,745 of Parra teaches a vortex-type flow meter for insertion into a pipe carrying a fluid. The flowmeter of the '745 patent includes a tubular bluff body that includes an opening bridged by a separate bluff body. Both bluff bodies produce vortices, but those produced by the tubular body cause an unwanted interference with the vortices produced by the other bluff body, thereby causing measurement errors. Fins are added to suppress the unwanted vortices. The design is cumbersome inasmuch as it employs two, rather than one, bluff bodies, and ancillary structures for minimizing interference between the vortices induced by the two bluff bodies. In addition, the tubular bluff body of the '745 patent introduces added flow obstruction, thereby increasing pressure losses across the flow meter which in turn increases costs associated with pumping the fluid through the meter.

It is thus an object of the invention to provide a vortex flowmeter having a removable and replaceable obstruction element.

It is another object of the invention to provide a vortex flowmeter having an obstruction element that partially spans the inner diameter of a pipe for guiding the flow of a process fluid.

SUMMARY OF THE INVENTION

The invention attains the foregoing and other objects by providing an insertion-type vortex flow meter that includes a pipe having a wall that forms a conduit for guiding a flowing fluid, herein referred to as process fluid, therethrough. The pipe of the flow meter includes an opening therein that allows an obstruction element to be removably and replaceably disposed within the conduit. The obstruction element is configured to span the inner diameter of the pipe partially, and is suspended rigidly within the conduit. The flow of the fluid past the obstruction element produces two streams of vortices, with the vortices in one stream staggered or spatially offset with respect to those in the other stream. A sensor element, disposed within the obstruction element, detects the induced vortices, thereby measuring the flow velocity of the fluid.

According to one aspect of the invention, the obstruction element is connected to a support element, such as a tube, that allows easy insertion of the obstruction element into the conduit, and further allows adjustable positioning of the obstruction element at a desired distance from the wall of the pipe.

Another aspect of the invention relates to providing the obstruction element with a flow conditioning element, such as a tubular section or end plates attached to the shedder or blunt surface, to define the boundaries of the induced vortices, which in turn helps stabilize the vortex shedding over a wide frequency range. Such a stabilization of the vortex shedding ensures production of a strong stable signal, and improves the linearity of the shedding frequency as a function of the flow velocity. Further, such flow conditioning elements advantageously ensure that the frequency of the induced vortices is substantially independent of the size and/or the shape of the conduit for guiding the fluid.

According to another aspect, the flow conditioning element has a major axis that extends axially along or within the pipe, and is coupled or attached to an obstruction element. The axially extending flow conditioning element preferably has a the pipe. This positioning and arrangement of flowmeter components eliminates the need for forming additional unwanted structure, such as stabilizing or vortex reducing/ canceling fins, on the obstruction element.

According to another practice, the flowmeter of the invention includes a first flange sub-assembly having a first flange for disposing a flow-obstruction element within an opening in the pipe. The obstruction element has a sensor element for detecting a stream of vortices induced by the flow obstruction element for thereby measuring the flow velocity of the fluid. The flowmeter also includes a second flange sub-assembly having a second flange for coupling to the first flange for mounting the first flange sub-assembly to the pipe. According to one practice, a first flange is couple to the outside surface of the pipe wall as an anchor for suspending the obstruction element rigidly within the conduit. In particular, the obstruction element is attached to a second flange that is mounted on the first flange, thereby holding the obstruction element in place within the conduit.

The invention in one aspect provides convenient removal and replacement of the obstruction element. In particular, some embodiments of the invention include a hot tap for replacement of the obstruction element without stopping the flow of the process fluid. Further, the obstruction element of the present invention can be installed in pipes having a variety of different inner diameters without machining the obstruction element to size it for a particular pipe size.

These and other features of the invention are more fully set forth below with reference to the detailed description of illustrated embodiments, and the accompanying figures in which like numerals refer to like elements.

BRIEF DESCRIPTION OF THE DRAWINGS

FIG. 3 is a cross-sectional view of another embodiment of a vortex flow meter according to the invention in which the obstruction element is attached to an axially extending flow-conditioning tube, in addition to flow conditioning plates, for defining the boundaries of the induced vortices.

DESCRIPTION OF ILLUSTRATED EMBODIMENTS

Figure 1:
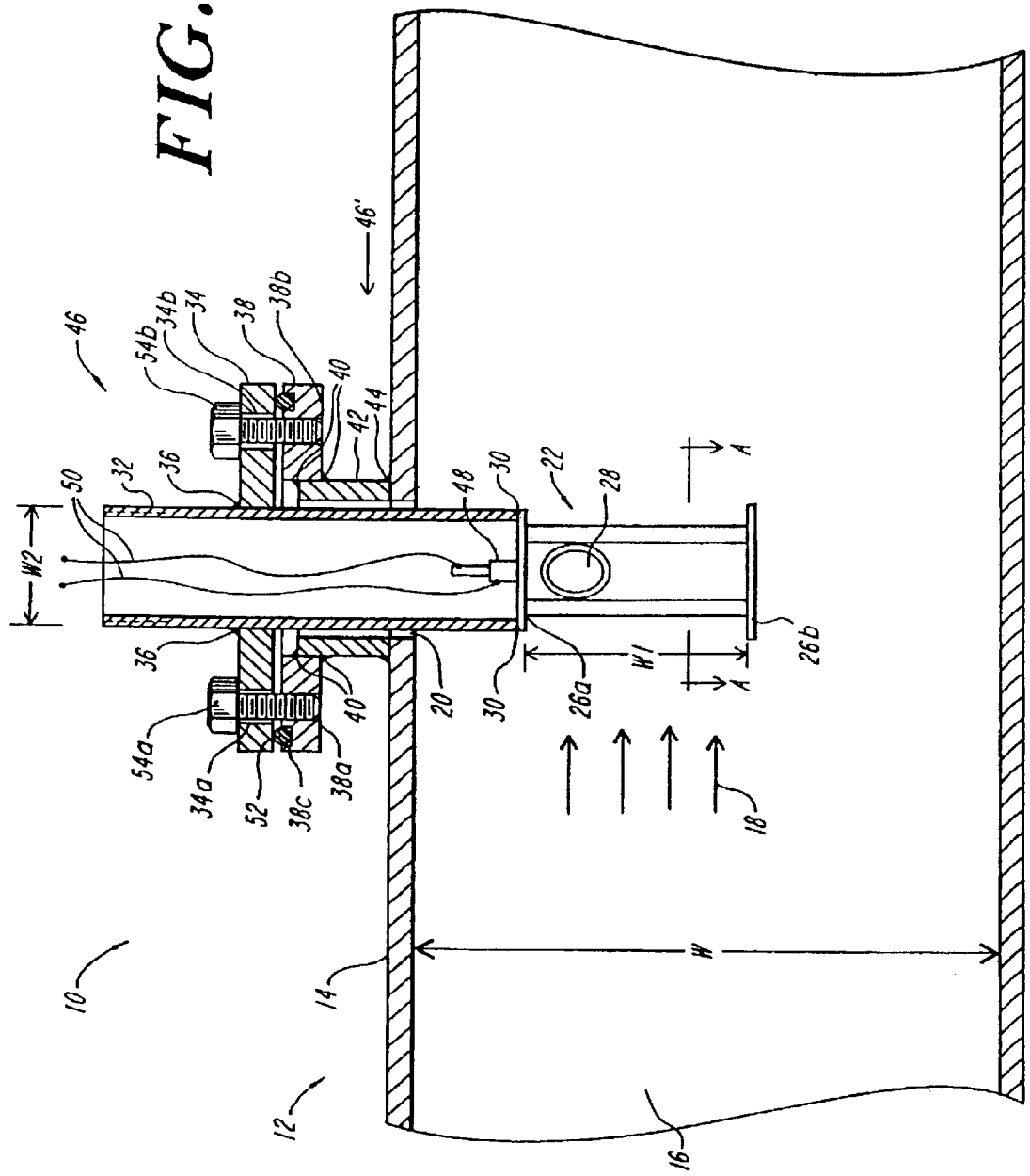
FIG. 1 is a cross-sectional view of a vortex flow meter according to the invention having a tubular pipe forming a conduit for guiding the flow of a process fluid therethrough, where the pipe includes an opening to allow the insertion of an obstruction element within the conduit. The obstruction element is rigidly suspended within the conduit and partially spans the inner diameter of the conduit.

FIG. 1 illustrates a vortex flowmeter 10 according to the invention that includes a pipe 12 having a wall 14 forming a conduit 16 having an inner diameter W for guiding a flowing fluid 18, herein referred to as process fluid, therethrough. The pipe wall 14 includes an opening 20 therein, through which a flow obstruction element 22 is inserted into the conduit 16. The term axial, as herein employed, refers to the direction of fluid flow, and the term radial refers to a direction perpendicular to that of fluid flow. The axial flow of the process fluid past the obstruction element produces two streams of staggered, or otherwise offset, vortices 24a and 24b, was shown in FIG. 2. The illustrated obstruction element 22 has a length w1, typically approximately 2 inches (5 cm), which length is a fraction of the inner diameter W of the conduit 16. Thus, the obstruction element 22 only partially spans the inner diameter of the conduit 16. Further, the embodiments and arrangement of components described herein are intended to be merely exemplary in nature, and other configurations and arrangements are readily recognizable by those of ordinary skill in the art are suitable and intended to be covered by the present teachings.

Figure 1A:
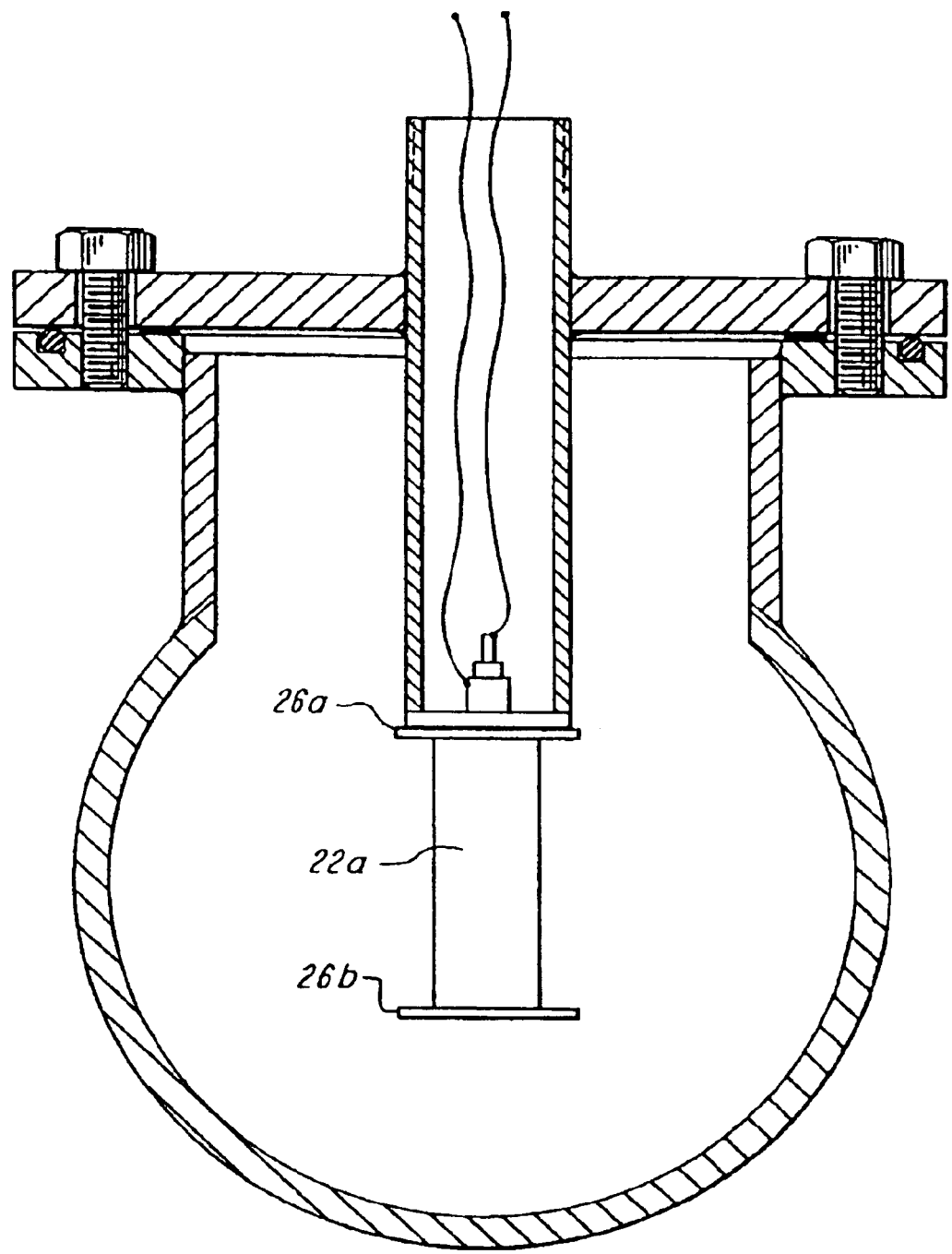
FIG. 1a is a cross-sectional view of the vortex flow meter of FIG. 1 along the axial direction, illustrating the blunt surface of the obstruction element and flow conditioning plates attached to the obstruction element.

Two plates 26a and 26b each attached to one end of the obstruction element 22 function as flow conditioning elements, and define the boundaries of the induced vortices, stabilize the vortices, and linearize the vortex shedding frequency as a function of the flow velocity. FIG. 1A illustrates another cross-sectional view of the obstruction element 22, and the flow-conditioning plates 26a and 26b along the direction of fluid flow, i.e., the axial direction. This axial view shows that the obstruction element 22 includes a blunt or shedding surface 22a facing the fluid flow, where the impact of the fluid on this surface induces two streams of staggered vortices. The plates 26a and 26b extend beyond the surfaces of the obstruction element 22, both axially and radially, and provide flow conditioning, as shown in FIGS. 1, 1a, and 3. The plates can have any selected shape or size.

Referring back to FIG. 1, two flexible sensing diaphragms 28, one of which is shown, are welded on two opposed surfaces of the obstruction element. These diaphragms enclose a cavity (not shown) that contains a suitable electromechanical transducer or sensor element for producing electrical signals in response to pressure variations caused by the passage of the induced vortices. Sensors suitable for use in the present invention are known in the art. For example, the invention can employ a piezoelectric crystal situated in a cavity filled with silicon oil and covered by sensing diaphragms, as a transducer for detecting the vortices. In particular, the sensing diaphragms transmit pressure fluctuations caused by the vortices to the piezoelectric crystal through the filling fluid, and the piezoelectric crystal produces electrical signals in response to the pressure fluctuations. A sensor of this type is utilized in a vortex flowmeter manufactured by Foxboro under the trade designation E83 Vortex Flowmeter. An electronic module (not shown), such as the module employed in the aforementioned Foxboro E83 Vortex Flowmeter, receives these electrical signals, determines the frequency of the induced vortices, and scales the shedding frequency to obtain the flow velocity or the volumetric flow rate in desired units, e.g., ft/sec or gallons per minute.

A leak-tight weld 30 attaches the obstruction element 22 to support element, such as tube 32, which in turn is attached to a flange 34 through a leak-tight weld 36. Another flange 38 is attached by a leak-tight weld 40 to a neck 42, which is in turn attached to the pipe 12 by another leak-tight weld 44. The combination of the obstruction element 22, the tube 32, and the flange 34 forms a vortex-inducing and vortex-sensing first sub-assembly 46. The flange 38 and the neck 42 form a second sub-assembly 46' that can engage the first sub-assembly 46 to mount the sub-assembly 46 removably and replaceably on the pipe 12. An electrical feed through 48, connected to the obstruction element 22, allows the passage of electrical cables 50 from the sensor through the hollow interior of the tube 32 to the electronic module. The cables 50 transmit the electrical signals produced by the sensor to the electronic module.

The subassembly 46 is mounted on the pipe 12 such that the tube 32 having an outer diameter W2 that is smaller than the diameter of the opening 20 is at least partially inserted into the conduit 16. The tube 32 allows convenient insertion and positioning of the obstruction element 22 within the conduit 16. In particular, the length of the tube 32 can be selected to position the obstruction element 22 within the conduit 16 at a desired distance from the wall 14. Further, the tube 32 holds the obstruction elements 22 rigidly in place within the conduit 16. The welds can be formed in accordance with various art known techniques. Moreover, other types of securing techniques can be used and are intended to be covered by the teachings of the present invention.

Those of ordinary skill will also recognize that the present flow meter car be modified such that only one of the flange sub-assemblies are employed to secure and retain the obstruction element within the pipe. The sub-assemblies can include various components, including any combination of components described herein.

The flange 38 includes four tapped holes, two of which 38a and 38b are shown, and a groove 38c for seating a sealing element, such as an O-ring 52 or a gasket. The flange 34 includes four clearance openings therein, two of which 34a and 34b are shown, that can be put in register with the tapped holes of the flange 38. Four fasteners, two which 54a and 54b are shown, such as screws, bolts and the like, pass through the openings in the flange 34, and engage with the tapped holes in the flange 38, to join the sub-assembly 46 to the pipe 12. Upon engagement of the flange 34 with the flange 38, the O-ring 52, or a flange gasket, provides a fluid-tight seal between the pipe 12 and the outside environment.

The present insertion-type vortex flow meter provides a number of advantages over conventional vortex flowmeters having obstruction elements that span the entire diameter of the fluid-guiding pipe. For example, the installation of the obstruction element of the present invention in a fluid-guiding pipe is easy. In particular, the fluid-guiding pipe can be easily modified or retrofitted to accommodate an obstruction element according to the invention. Such modification consists of providing the opening 20 in the pipe 12, welding the sub-assembly 46' to the pipe 12, welding the tube 32 to the obstruction element 22 and to the flange 34 to provide the sub-assembly 46, and engaging the sub-assembly 46 with the sub-assembly 46', to mount the sub-assembly 46 onto the pipe 12. Further, the same sub-assemblies can be installed in pipes having different inner diameters, thus lowering the manufacturing cost of producing flowmeters for pipes of different sizes. In addition, the sub-assemblies 46 and 46' can be mounted onto an installed pipe without any need for a separate pipe section for housing the obstruction element and the sensor, and without any need for end flanges on the pipe section and on the pipe 12 for mating the pipe 12 to such a separate pipe section. This can lead to considerable savings because such extra components can be expensive. For example, end flanges and pipe sections are typically made of stainless steel and are expensive, especially for pipes having large sizes. Hence, the present flowmeter can be inserted within the pipe without requiring the use of expensive integral components, such as pipe sections.

Another distinct advantage of the flowmeter of the present invention is that it is particularly suited for use with pipes having large inner diameters, e.g., one foot diameter or greater, as described below. A Strouhal number S is a dimensionless quantity that is defined as:

$$S = \frac{\text{width of vortex shedder} * \text{shedding frequency}}{\text{flow velocity}}$$

Figure 2:
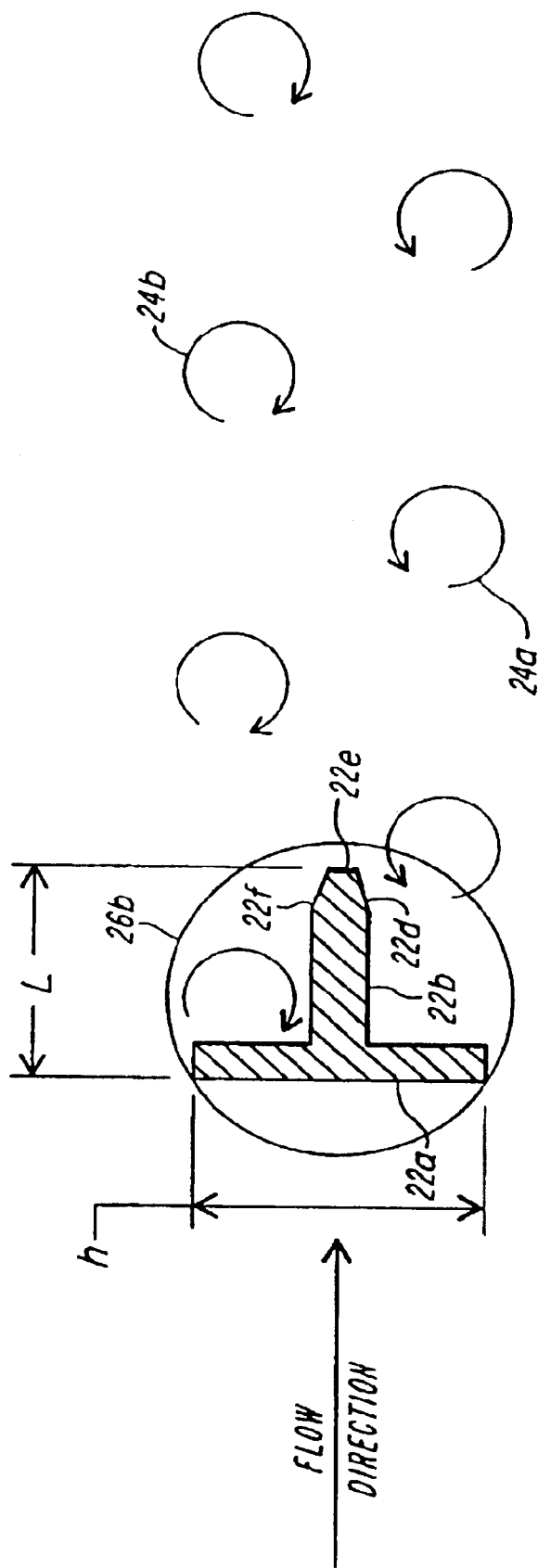
FIG. 2 is a view of the obstruction element of FIG. 1 along the line A—A, illustrating that the obstruction element includes a blunt surface facing the flow of fluid for producing vortices and a tail portion for stabilizing the formation of the vortices.

For an obstruction element as shown in FIGS. 1 and 2, having a ratio of width h to length w1, i.e., h/w1, of 0.3, and having a ratio of tail length L to width h, i.e., L/h, of 1.04, a Strouhal number of approximately 0.3 is obtained. Such a vortex shedder provides excellent linearity of the vortex shedding frequency versus the flow rate, e.g., ±0.5 percent of the flow rate, over a wide range of flow rates. It is known in the art that it is desirable to scale dimensions of the obstruction element for different sized pipes, e.g., scale up the dimensions of the shedder as the pipe size increases and scale down the dimensions of the shedder as the pipe size decreases, such that the Strouhal number and the degree of linearity of the shedding frequency versus the flow rate remain constant as the pipe size varies. Such a scaling results in the shedding frequency being inversely proportional to the pipe diameter. Therefore, a conventional flow meter having an obstruction element that spans the entire inner diameter W of a 12 inch fluid-guiding pipe, has a width h such that h/W is 0.31, and has a tail length L such that h/L is 1.04. Such a vortex shedder has a shedding frequency of only about 1 Hz for a flow velocity of 1 ft/sec.

It is known that an average signal corresponding to a number of vortex shedding cycles is required for improving the signal to noise ratio of the vortex-induced signals, to obtain an accurate shedding frequency. Thus, long averaging times are needed in a vortex flowmeter having a large pipe and a vortex shedder spanning the entire diameter of the pipe, to obtain an accurate shedding frequency. Such long averaging times, however, decrease the speed of the response of the flowmeter. In contrast, the shedder of the present invention does not span the entire diameter of the pipe, and hence produces vortices at a higher frequency than those in conventional flowmeters having large pipes. In a preferred embodiment of the present invention, the shedder has a length w1 of approximately 2 inches (5 cm), to produce a vortex shedding frequency of about 6 Hz for a flow velocity of 1 ft/sec. Thus, the present flowmeter can measure the average shedding frequency without sacrificing the speed of the response.

The vortex-inducing portion of the obstruction element 22 has a geometrical shape similar to the vortex shedder described in U.S. Pat. No. 4,088,020 of Foxboro, herein incorporated by reference. In particular, FIG. 2, a cross-sectional view of the obstruction element 22 along the line AA, illustrates the blunt surface 22a, and a "tail" section 22b formed of three surfaces 22d, 22e, and 22f. The insertion of the obstruction element 22 into the conduit 16 is such that the blunt surface 22a faces the flowing fluid. The impact of the flowing fluid against the blunt surface 22a induces two streams of staggered vortices 24a and 24b travelling downstream of the blunt surface 22a, as shown in FIG. 2. The "tail" portion 22b stabilizes the formation of these vortices, and its length affects the linearity of the shedding frequency versus flow velocity. Those skilled in the art will understand that geometrical shapes other than that shown in FIG. 2, such as triangular or trapezoidal, can be employed for construction of a vortex shedder suitable for use in the present invention.

Figure 3A:
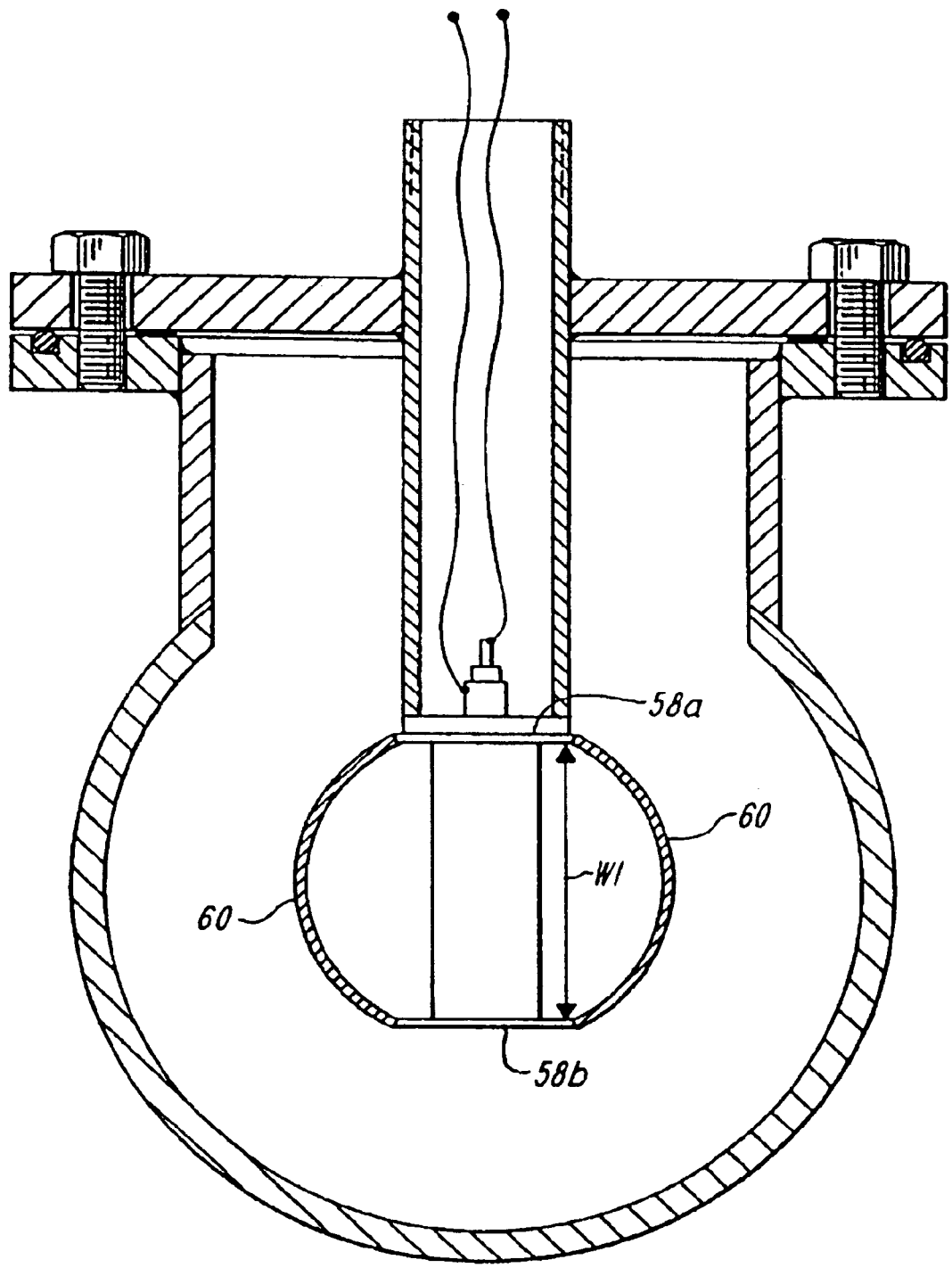
FIG. 3A is a cross-sectional view of the embodiment of FIG. 3 along the axial direction, illustrating the blunt surface of the obstruction element, and the end plates welded to the flow-conditioning tube, where both the end plates and the flow conditioning tube function as flow conditioning elements.
Figure 3B:
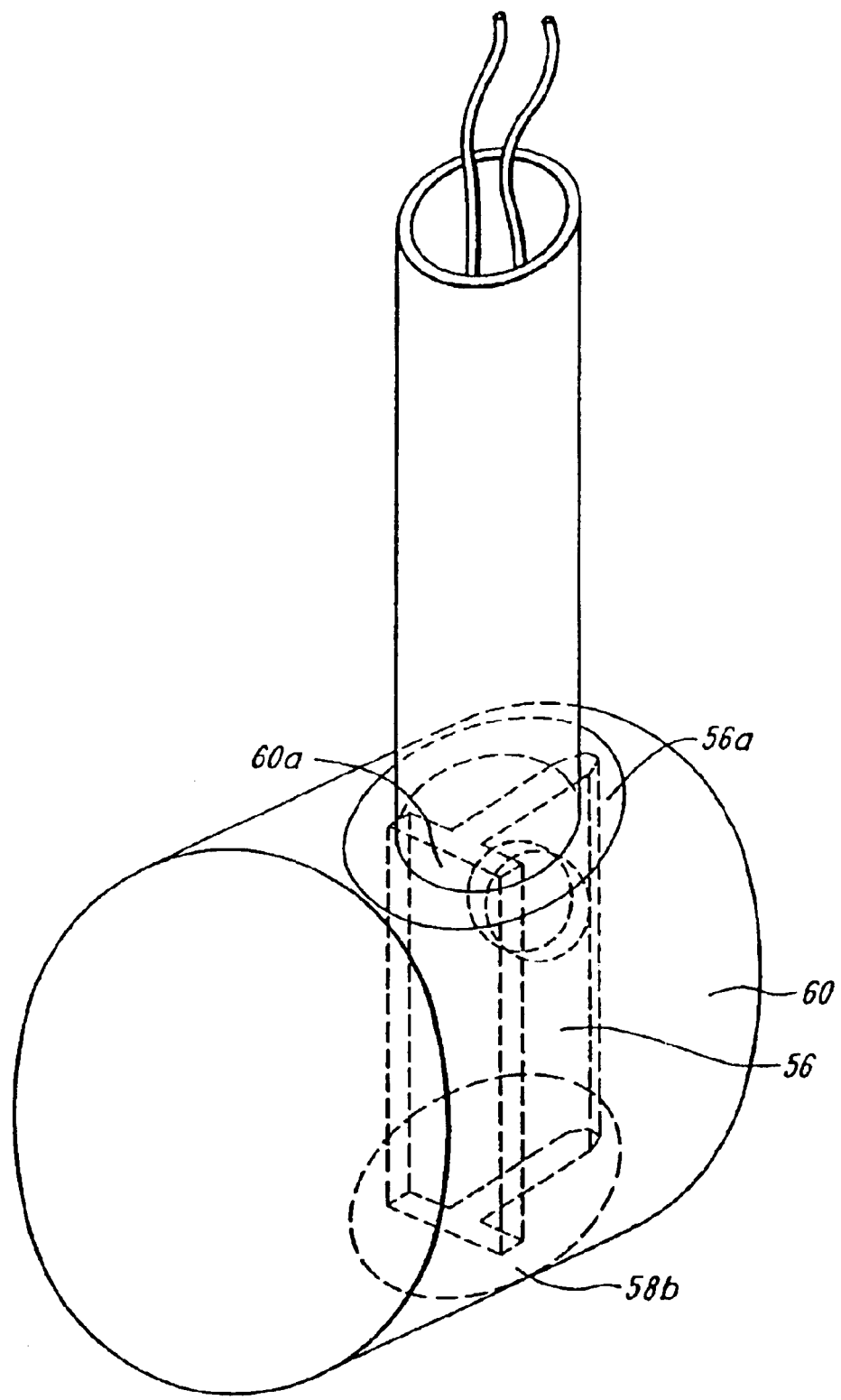
FIG. 3B is a perspective view of the obstruction element and the flow conditioning elements of FIG. 3.

With reference to FIGS. 3, 3a, and 3b, another embodiment of a vortex flowmeter according to the teachings of the present invention, includes an obstruction element 56 having a vortex-inducing portion 56a, with end plates 58a and 58b, and a flow-conditioning element, such as a tube 60 having a radial opening 60a therein, One practice of the invention inserts the obstruction element 56 with the end plates 58a and 58b into the tube 60, and attaches the obstruction element to the tube 60, for example, through a weld 62.

FIG. 3A provides a cross-sectional view of the plates 58a and 58b, and the flow-conditioning tube 60 having a major axis that is axially disposed along the direction of fluid flow, e.g., is parallel to fluid flow. The flow-conditioning tube 60, in addition to the end plates 58a and 58b, provides further flow-conditioning, and defines the boundaries of the vortices generated by the obstruction element 56. The tube 60 preferably extends axially or horizontally along the flow direction, and is disposed generally transversely, and preferably orthogonally, to the obstruction element 56. The flow conditioning tube 60 preferably has a profile that reduces or eliminates the generation of unwanted vortices. For example, the element 60 can have a relatively thin wall that does not create significant flow separation. This profile allows the obstruction element to induce a relatively "clean" stream of vortices that include nominal or insignificant amounts of or are generally or completely free of unwanted vortices. In contrast, prior designs employed a construction where the obstruction element is parallel to the support element, thereby generating unwanted vortices.

A significant advantage of positioning the flow conditioning element transversely does not generate unwanted vortices. This positioning and arrangement of flowmeter components eliminates the need for forming additional unwanted structure, such as vortex reducing or canceling fins, on the obstruction element.

In a preferred embodiment of the invention, a distance w1 between the end plates 58a and 58b is selected to be approximately 2 inches (5 cm), and the obstruction element is configured such that the ratio of its width h, as shown in FIG. 2, over the distance w1, i.e., h/w1, is 0.31, and the ratio of the tail length L of the obstruction element, as shown in FIG. 2, over the distance w1, i.e., L/w1, is 1.04. The resulting shedding frequency of such an obstruction element is approximately 6 Hz per ft/sec of flow velocity, and is advantageously independent of the size and/or the shape of the pipe 12. This relatively high shedding frequency ensures accurate determination of the shedding frequency and a quick response time, even in very large pipes.

A perspective view, provided by FIG. 3B, of the flow-conditioning end plates 58a and 58b, the flow conditioning tube 60, and the obstruction element 56 further clarifies the geometrical shapes of these components, and their locations relative to each other. This figure also illustrates better the opening 60a in the flow-conditioning tube 60, through which the end plates 58a and 58b, and the obstruction element 56 are inserted.

Figure 3C:
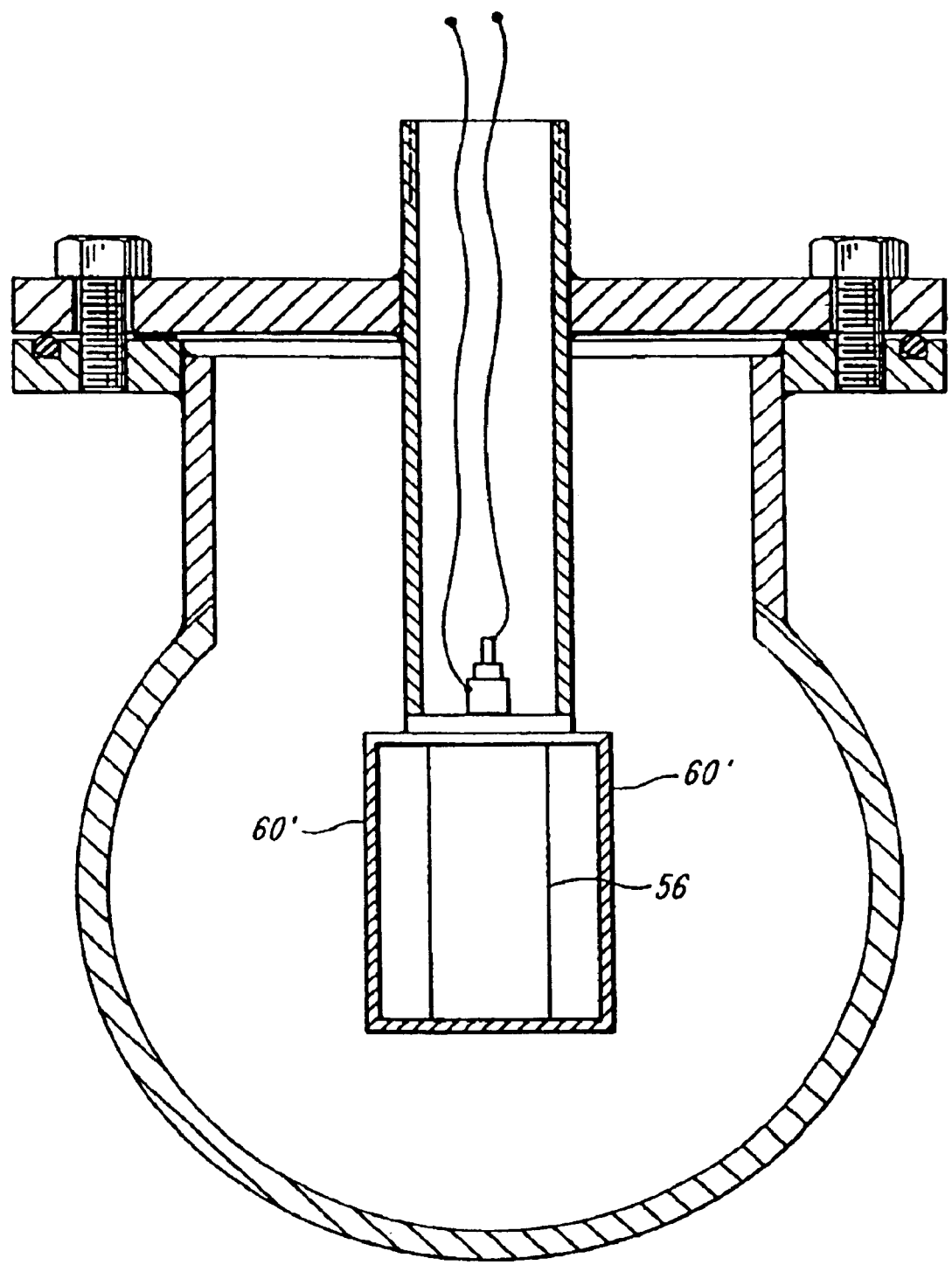
FIG. 3C is a cross-sectional view of the flowmeter embodiment of FIG. 3 along the direction of fluid flow, illustrating a flow conditioning element in the form of a rectangular duct attached to the obstruction element that is removably and replaceably inserted within a fluid guiding conduit.

A vortex flowmeter of the invention can employ a variety of flow conditioning elements, in combination with the obstruction element, for flow conditioning. In particular, such flow conditioning elements are not limited to the arcuate types described above. For example, FIG. 3C illustrates an embodiment of the invention that includes a rectangular flow conditioning duct 60', attached to the shedder 56. It should be understood that the flow-conditioning plates 26a and 26b, shown in FIGS. 1 and 2, can be rectangular rather than circular. Those of ordinary skill will readily recognize that other shapes are also contemplated by the present invention.

With reference back to FIG. 3, a pipe 12 guides the flowing fluid through a conduit 16 formed by the wall 14. A first sub-assembly 64 includes a first flange 34, welded to a support element or tube 32, which is in turn welded to the obstruction element 56. The sub-assembly 64 further includes the flow-conditioning elements 58a, 58b, and the flow-conditioning tube 60. A second sub-assembly 64' includes a neck 68, welded to the pipe 12, and a second flange 66, welded to the neck 68. The engagement of the first sub-assembly 64 with the second sub-assembly 64' positions the obstruction element 56 removably and replaceably within the conduit 16. As in the previous embodiment, the length of the tube 32 can be sized or positioned to place the obstruction element at a desired distance from the wall of the conduit 16, upon mounting the sub-assembly 64 onto the pipe 12. Those of ordinary skill will readily recognize that other types of securing, support, and retention mechanisms can be employed in connection with the flow conditioning and obstruction elements of the present invention.

One practice of the invention employs a hot-tap retractor for removal and/or replacement of the obstruction element without shutting down the flow of the process fluid. A number of such retractors suitable for use in combination with the obstruction element of the present invention are known in the art. For example, U.S. Pat. No. 5,303,602, herein incorporated by reference, discloses a tool for inserting and removing sensing elements through stuffing boxes of hot taps in high pressure pipelines that can be employed to insert and/or to remove the obstruction element of the present invention into a fluid-guiding pipe. U.S. Pat. No. 5,106,580, herein incorporated by reference, provides another example of a retraction tool that can be employed to insert the obstruction element of the invention into a fluid-guiding pipe.

It will thus be seen that the invention efficiently attains the objects set forth above, including providing a vortex flowmeter having a removable and replaceable obstruction element. Since certain changes may be made to the above constructions and the described methods without departing from the scope of the invention, it is intended that all matter contained in the above description or shown in the accompanying drawings be interpreted as illustrative and not in a limiting sense.

Having described the invention, what is claimed as new and desired to be secured by Letters Patent is:

1. A vortex flowmeter for determining a flow velocity of a fluid flowing in a pipe, the vortex flowmeter comprising:
   a flow-obstruction element for inducing a stream of vortices in the fluid, the flow-obstruction element including a sensor element for determining the flow velocity of the fluid based on the vortices, and a plurality of diaphragms disposed on opposed sides of the flow-obstruction element to transmit at least one pressure fluctuation associated with the vortices to the sensor element, and at least one elate disposed at opposite radial ends of the flow-obstruction element for directing fluid flow, the opposite radial ends being disposed on an axis perpendicular to a direction of fluid flow, a first flange sub-assembly having a first flange for removably and replaceably disposing the flow-obstruction element through an opening in the pipe, the flow-obstruction element sized and positioned to partially span the pipe when disposed therein, and a second flange sub-assembly having a second flange for coupling to the first flange for mounting the first flange sub-assembly to the pipe.

2. The flowmeter of claim 1, wherein the first flange sub-assembly comprises a support element configured for coupling to one end of the flow-obstruction element for disposing the flow-obstruction element within the pipe.

3. The flowmeter of claim 1, wherein the second flange sub-assembly comprises a neck element configured for mounting to the pipe at one end and to the second flange at the other end.

4. The flowmeter of claim 1, wherein the first flange sub-assembly comprises a support element configured for coupling to the flow-obstruction element at one end and to the first flange, and wherein the second flange sub-assembly includes a neck element configured for mounting to the pipe at one end and to the second flange at the other end.

5. The flowmeter of claim 1, further comprising one or more fastener elements for fastening the first flange to the second flange when assembled.

6. The flowmeter of claim 5, further comprising an O-ring disposed in a groove formed in one of the first and second flanges to form a fluid tight seal therebetween.

7. The flowmeter of claim 1, further comprising a flow-conditioning element coupled to the flow-obstruction element for defining the boundaries of the vortices.

8. The flowmeter of claim 7, wherein the flow-conditioning element has a major axis that extends axially within the pipe and transversely to the flow-obstruction element.

9. The flowmeter of claim 7, wherein the flow-conditioning element has at least one of a substantially tubular and a substantially rectangular shape.

10. A vortex flowmeter for determining a flow velocity of a fluid flowing in a pipe, the vortex flowmeter comprising:

a flow-obstruction element disposable in the fluid through an opening in the pipe, the flow-obstruction element being disposed in the pipe such that the flow of the fluid past the flow-obstruction element creates a stream of vortices, the flow-obstruction element being removably and replaceably disposable within the pipe and sized and positioned to partially span the pipe when disposed therein, a support element attached at one end to the flow-obstruction element, the support element having a first flange attached to an outer surface at a predefined distance from the flow-obstruction element, a second flange coupled to an outer surface of the pipe, the second flange configured for mating engagement with the first flange, and a sensor element located within the flow-obstruction element for determining the flow velocity of the fluid based on the vortices, wherein the flow-obstruction element includes a plurality of diaphragms disposed on opposed sides of the flow-obstruction element to transmit at least one pressure fluctuation associated with the vortices to the sensor element and at least one plate disposed at opposite radial ends of the flow-obstruction element for directing fluid flow, the opposite radial ends being disposed on an axis perpendicular to a direction of fluid flow.

11. A vortex flowmeter for determining a flow velocity of a fluid flowing in a pipe, the vortex flowmeter comprising:

a flow-obstruction element disposable in the fluid through an opening in the pipe; the flow-obstruction element being suspended in the pipe such that the flow of the fluid past the flow-obstruction element creates a stream of vortices, the flow-obstruction element being removably and replaceably disposable within the pipe and sized and positioned to partially span the pipe when disposed therein, a flow-conditioning element coupled to the flow-obstruction element, the flow-conditioning element having a major axis that extends axially within the pipe and transversely to the flow-obstruction element, a support assembly for supporting the flow-obstruction element and the flow-conditioning element within the pipe, and a sensor element located within the flow-obstruction element for determining the flow velocity of the fluid based on the vortices, wherein the flow-obstruction element includes a plurality of diaphragms disposed on opposed sides of the flow-obstruction element to transmit at least one pressure fluctuation associated with the vortices to the sensor element and at least one plate disposed at opposite radial ends of the flow-obstruction element for directing fluid flow, the opposite radial ends being disposed on an axis perpendicular to a direction of fluid flow.

12. The flowmeter of claim 11, further comprising means for securing the flow-obstruction element to the flow-conditioning element.

13. The flowmeter of claim 11, further comprising a weld for securing the at least one plate of the flow-obstruction element to the flow-conditioning element.

14. The flowmeter of claim 11, further comprising an aperture formed in an outer wall of the flow-conditioning element and sized for seating the flow-obstruction element.

15. The flowmeter of claim 11, wherein the support assembly further comprises a first sub-assembly for coupling to at least one of the flow-obstruction element and the flow-conditioning element and supporting the corresponding element within the pipe.

16. The flowmeter of claim 15, wherein the support assembly further comprises a second sub-assembly coupled to the first sub-assembly for securing the first sub-assembly to the pipe.

17. The flowmeter of claim 11, wherein the support assembly comprises a support element coupled at one end to at least one of the flow-obstruction element and the flow-conditioning element, and a first flange coupled to an outer wall of the support element for supporting the flow-obstruction element within the pipe.

18. The flowmeter of claim 17, further comprising a neck portion coupled to an outer wall of the pipe, and a second flange coupled to the neck portion of the first flange for securing the first flange to the pipe.

19. The flowmeter of claim 18, further comprising one or more fastener elements for fastening the first flange to the second flange when assembled.

20. The flowmeter of claim 17, wherein the support element comprises a tube.

21. The flowmeter of claim 11, wherein the vortices hate a shedding frequency independent of the size and shape of the pipe.

22. A method for selecting the position of a flow-obstruction element within a pipe, the method comprising:
providing a single component set for a flow meter,
attaching a support element from the component set to a flow-obstruction element from the component set, the flow-obstruction element including at least one plate disposed at opposite radial ends of the flow-obstruction element for directing fluid flow, the opposite radial ends being disposed on an axis perpendicular to a direction of fluid flow,
removably and replaceably disposing the flow-obstruction element within the pipe,
positioning the flow-obstruction element at a predetermined distance from an inner wall of the pipe so as to partially span the pipe when disposed therein, securing the support element to the pipe to secure the flow-obstruction element at the predetermined distance, and
transmitting, to a sensor element disposed within the flow-obstruction element, at least one pressure fluctuation associated with a stream of vortices induced in a flowing fluid by the flow-obstruction element, the at least one pressure fluctuation being transmitted by a plurality of diaphragms disposed on opposed sides of the flow-obstruction element.

23. The method of claim 22, further comprising determining the flow velocity of the flowing fluid based on the vortices.

24. The method of claim 22, wherein securing comprises securing the support element to a first flange from the component set, and
fastening the first flange to a second flange from the component set for coupling the first flange to the pipe.

25. The method of claim 24, further comprising securing the second flange to a neck portion from the component set, and attaching the neck portion to an outer surface of the pipe.

26. The method of claim 24, further comprising forming a fluid tight seal between the first and second flanges.

27. The method of claim 22, further comprising adjusting the radial position of the flow-obstruction element prior to securing the support element to the pipe.

28. The method of claim 22, further comprising coupling a flow-conditioning element to the flow-obstruction element for defining the boundaries of the vortices.

29. The method of claim 28, further comprising positioning the flow-conditioning element within the pipe such that a major axis of the flow-conditioning element extends axially within the pipe.

30. The method of claim 28, further comprising framing an opening in an outer wall of the flow-conditioning element, and disposing the flow-obstruction element trough the opening and within the flow-conditioning element.

31. The method of claim 22, further comprising defining the boundaries of the vortices.

32. The method of claim 22, further comprising generating vortices having a shedding frequency independent of the site and shape of the pipe.

33. A method for adjusting the position of a flow-obstruction element within a pipe, the method comprising:
attaching a support element from the component set to a flow-obstruction element from the component set, the flow-obstruction element including at least one plate disposed at opposite radial ends of the flow-obstruction element for directing fluid flow, the opposite radial ends being disposed on an axis perpendicular to a direction of fluid flow,
removably and replaceably disposing the flow-obstruction element within the pipe,
adjusting the radial position of the flow-obstruction element with the support element such that the flow-obstruction element is positioned a predetermined distance from an inner wall of the pipe so as to only partially span the pipe when disposed therein,
securing the support element to the pipe to secure the flow-obstruction element at the predetermined distance, and
transmitting, to a sensor element disposed within the flow-obstruction element, at least one pressure fluctuation associated with a stream of vortices induced in a flowing fluid by the flow-obstruction element, the at least one pressure fluctuation being transmitted by a plurality of diaphragms disposed on opposed sides of the flow-obstruction element.

34. A vortex flowmeter apparatus for determining a flow velocity of a fluid flowing in a pipe, the vortex flowmeter comprising:
a flow-obstruction element removably and replaceably disposable in the flowing fluid through an opening in the pipe, the flow-obstruction element being suspended in the pipe such that the flow of the fluid past the flow-obstruction element creates a stream of vortices, the flow obstruction element being sized and positioned to partially span the pipe when disposed therein,
one or more flange sub-assemblies for inserting the flow-obstruction clement into the pipe and for holding the flow-obstruction element rigidly in place within the pipe, and
a sensor element located within the flow-obstruction element for determining the flow velocity of the fluid based on the vortices,
wherein the flow-obstruction element includes a plurality of diaphragms disposed on opposed sides of the flow-obstruction element to transmit at least one pressure fluctuation associated with the vortices to the sensor element and at least one plate disposed at opposite radial ends of the flow-obstruction element for directing fluid flow, the opposite radial ends being disposed on an axis perpendicular to a direction of fluid flow.

35. A vortex flowmeter for determining a flow velocity of a fluid flowing in a pipe, the vortex flowmeter comprising:
a flow-obstruction element being removeably and replaceably disposable in the fluid through an opening in the pipe, the flow-obstruction element partially spanning the pipe when disposed therein, the flow-obstruction element including at least one plate disposed at opposite radial ends of the flow-obstruction element for directing fluid flow the opposite radial ends being disposed on an axis perpendicular to a direction of fluid flow,
a sensor disposed within the flow-obstruction element,
a plurality of diaphragms disposed on opposed sides of the flow-obstruction element, and,
at least one flange assembly for disposing the flow-obstruction element in the pipe.

36. The flowmeter of claim 35, wherein the flow-obstruction element comprises a blunt surface for inducing the vortices.

37. The flowmeter of claim 35, further comprising a flow-conditioning element coupled to the flow-obstruction element.

38. The flowmeter of claim 37, wherein the flow-conditioning element has a major axis that extends axially within the pipe and transversely to the flow-obstruction element.

39. The flowmeter of claim 37, further comprising an aperture formed in an outer wall of the flow-conditioning element and sized for seating the flow-obstruction element.

40. A vortex flowmeter for determining a flow velocity of a fluid flowing in a pipe, the vortex flowmeter comprising:

- a flow-obstruction element being removeably and replaceably disposable in the fluid through an opening in the pipe, the flow-obstruction element partially spanning the pipe when disposed therein,
- a sensor disposed within the flow-obstruction element,
- at least one plate disposed at opposite radial ends of the flow-obstruction element for directing fluid flow, the opposite radial ends being disposed on an axis perpendicular, to a direction of fluid flow, and
- at least one flange assembly for disposing the flow-obstruction element in the pipe.

41. The flowmeter of claim 40, wherein the flow-obstruction element further comprises a blunt surface for inducing the vortices.

42. The flowmeter of claim 40, wherein the flow-obstruction element further comprises a plurality of diaphragms disposed on opposed sides of the flow-obstruction element.

* * * * *

UNITED STATES PATENT AND TRADEMARK OFFICE
CERTIFICATE OF CORRECTION

PATENT NO. : 6,752,027 B1
DATED : June 22, 2004
INVENTOR(S) : Kalinoski

It is certified that error appears in the above-identified patent and that said Letters Patent is hereby corrected as shown below:

Column 8,
Line 67, replace "elate" with -- plate. --

Signed and Sealed this

Seventh Day of September, 2004

JON W. DUDAS
*Director of the United States Patent and Trademark Office*